US012737935B2

(12) United States Patent
Marri et al.

(10) Patent No.: US 12,737,935 B2
(45) Date of Patent: Sep. 15, 2026

(54) SHORT PROMPT TEXT-TO-IMAGE MODEL

(71) Applicant: ADOBE INC., San Jose, CA (US)

(72) Inventors: Venkata Naveen Kumar Yadav Marri, Newark, CA (US); Pranav Vineet Aggarwal, Santa Clara, CA (US); Markus Woodson, San Jose, CA (US); Ajinkya Gorakhnath Kale, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 167 days.

(21) Appl. No.: 18/536,645

(22) Filed: Dec. 12, 2023

(65) Prior Publication Data

US 2025/0191237 A1 Jun. 12, 2025

(51) Int. Cl.
*G06T 11/00* (2026.01)
*G06V 20/70* (2022.01)

(52) U.S. Cl.
CPC .............. *G06T 11/00* (2013.01); *G06V 20/70* (2022.01)

(58) Field of Classification Search
None
See application file for complete search history.

(56) References Cited

U.S. PATENT DOCUMENTS

2021/0271707 A1* 9/2021 Lin ...................... G06V 30/274
2023/0169147 A1* 6/2023 Sivakumar .............. G06N 5/02 382/159
2024/0028634 A1* 1/2024 Liang .................. H04N 21/854
2024/0282016 A1* 8/2024 Liu ........................ G06Q 50/01
2025/0005901 A1* 1/2025 Cha ....................... G06V 10/74

OTHER PUBLICATIONS

Wen et al. (Hard Prompts Made Easy: Gradient-Based Discrete Optimization for Prompt Tuning and Discovery, Advances in Neural Information Processing Systems, Jun. 2023) (Year: 2023).*
Zhang et al. (AdaDiff: Adaptive Step Selection for Fast Diffusion, Computer Vision and Pattern Recognition, Nov. 2023) (Year: 2023).*
Chen et al. (PIXART-α: Fast Training of Diffusion Trans Former for Photorealistic Text-to-Image Synthesis, Sep. 2023) (Year: 2023).*
Brade et al. (Promptify: Text-to-Image Generation through Interactive Prompt Exploration with Large Language Models, Human-Computer Interaction, Apr. 2023) (Year: 2023).*

(Continued)

*Primary Examiner* — Kyle Zhai
(74) *Attorney, Agent, or Firm* — F. CHAU & ASSOCIATES, LLC

(57) ABSTRACT

A method, apparatus, non-transitory computer readable medium, and system for image processing include obtaining a text prompt. The method, apparatus, non-transitory computer readable medium, and system further include selecting an image generation model based on a length of the text prompt. In one aspect, the image generation model is trained to generate images using training data including text prompts below a threshold length. An aspect further includes generating, using the selected image generation model, a synthetic image based on the text prompt. In one aspect, the synthetic image includes an element described by the text prompt.

19 Claims, 11 Drawing Sheets

(56) References Cited

OTHER PUBLICATIONS

Li et al. (Oscar: Object-Semantics Aligned Pre-training for Vision-Language Tasks, Computer Vision and Pattern Recognition, Jul. 2020) (Year: 2020).*

Mokady et al. (Null-text Inversion for Editing Real Images using Guided Diffusion Models, Computer Vision and Pattern Recognition, Nov. 2022) (Year: 2022).*

1Radford, et al., "Learning Transferable Visual Models From Natural Language Supervision", arXiv preprintarXiv:2103.00020v1 [cs. CV] Feb. 26, 2021, 48 pages.

* cited by examiner

Figure 2:
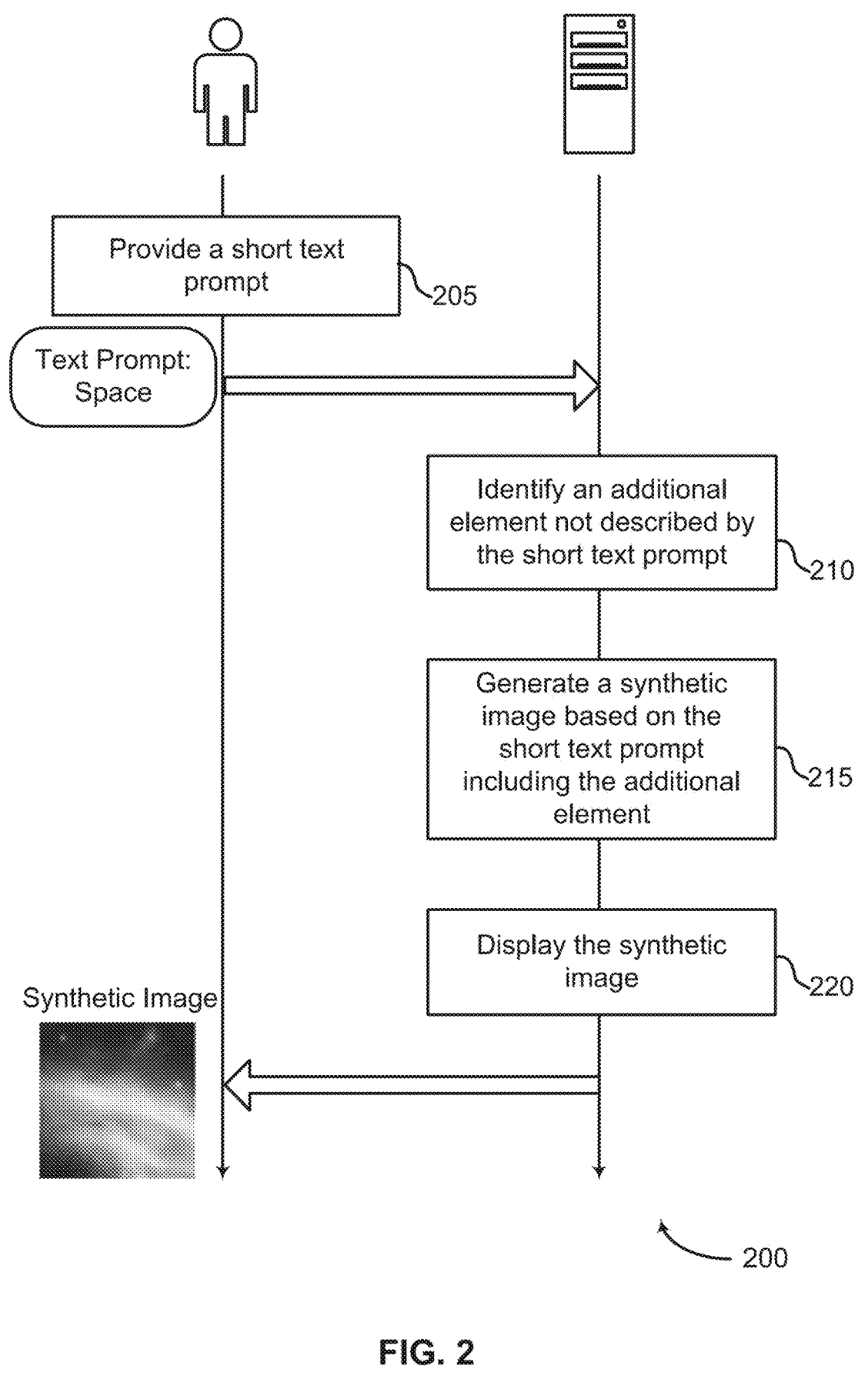

Provide a short text prompt

205

Text Prompt: Space

Identify an additional element not described by the short text prompt

210

Generate a synthetic image based on the short text prompt including the additional element

215

Display the synthetic image

220

Synthetic Image

SHORT PROMPT TEXT-TO-IMAGE MODEL

BACKGROUND

The following relates generally to image processing, and more specifically to image generation using a machine learning model. Image generation refers to the use of a computer to edit an image using an algorithm or a processing network. In some cases, image processing software can be used for various image processing tasks, such as image editing, image restoration, image detection, and image generation. For example, image generation includes the use of a machine learning model to generate an image based on a dataset. In some cases, the machine learning model is trained to generate a synthetic image based on a text, a color, a style, or an image

SUMMARY

Aspects of the present disclosure provide methods, non-transitory computer readable media, apparatuses, and systems for image processing. According to an aspect of the present disclosure, an image generation model is trained to generate a synthetic image based on a text prompt. In some cases, a data preparation component is trained to obtain a training dataset including text prompts and corresponding synthetic images. In some embodiments, the data preparation component divides captions of the synthetic images to obtain synthetic queries, which are used as text prompts to train the image generation model. For example, the text prompts and synthetic images are referred to as prompt-image pairs. In some cases, the prompt-image pairs are ranked based on semantic similarity scores. In some cases, the prompt-image pairs are ranked based on aesthetic scores. By training the image generation model with the ranked prompt-image pairs, embodiments of the present disclosure can generate a synthetic image having high aesthetics and semantic relevance based on an input of a text prompt.

In some embodiments, the data preparation component includes an image sampling scheme, where the data preparation component is trained to retrieve a synthetic image from a search index, where the synthetic image is ranked higher in aesthetics and semantic relevance. Moreover, by training the image generation model with the image sampling scheme, embodiments of the present disclosure can learn the relationships between text prompts and top-ranked synthetic images having high aesthetics and semantic relevance.

A method, apparatus, non-transitory computer readable medium, and system for image processing are described. One or more aspects of the method, apparatus, non-transitory computer readable medium, and system include obtaining a text prompt. One or more aspects include selecting an image generation model based on a length of the text prompt. In some cases, the image generation model is trained to generate images based on text prompts using training data including text prompts below a threshold length. One or more aspects include generating, using the image generation model, a synthetic image based on the text prompt. In some cases, the synthetic image includes an element described by the text prompt.

A method, apparatus, non-transitory computer readable medium, and system for image processing are described. One or more aspects of the method, apparatus, non-transitory computer readable medium, and system include obtaining training data including a text prompt describing an element and an image including the element described in the text prompt. In some cases, the text prompt is selected based on having a length less than a threshold length. One or more aspects include training an image generation model to generate synthetic images including the element based on the training data.

An apparatus, system, and method for image processing are described. One or more aspects of the apparatus, system, and method include at least one processor and at least one memory storing instructions and in electronic communication with the at least one processor. One or more aspects include an image generation model comprising parameters stored in the at least one memory and trained to generate synthetic images including an element based on training data including a text prompt describing the element and an image including the element described in the text prompt. In some cases, the text prompt is selected based on having a length less than a threshold length.

BRIEF DESCRIPTION OF THE DRAWINGS

FIG. 2 shows an example of a method for generating a synthetic image based on a text prompt according to aspects of the present disclosure.

DETAILED DESCRIPTION

Figure 1:
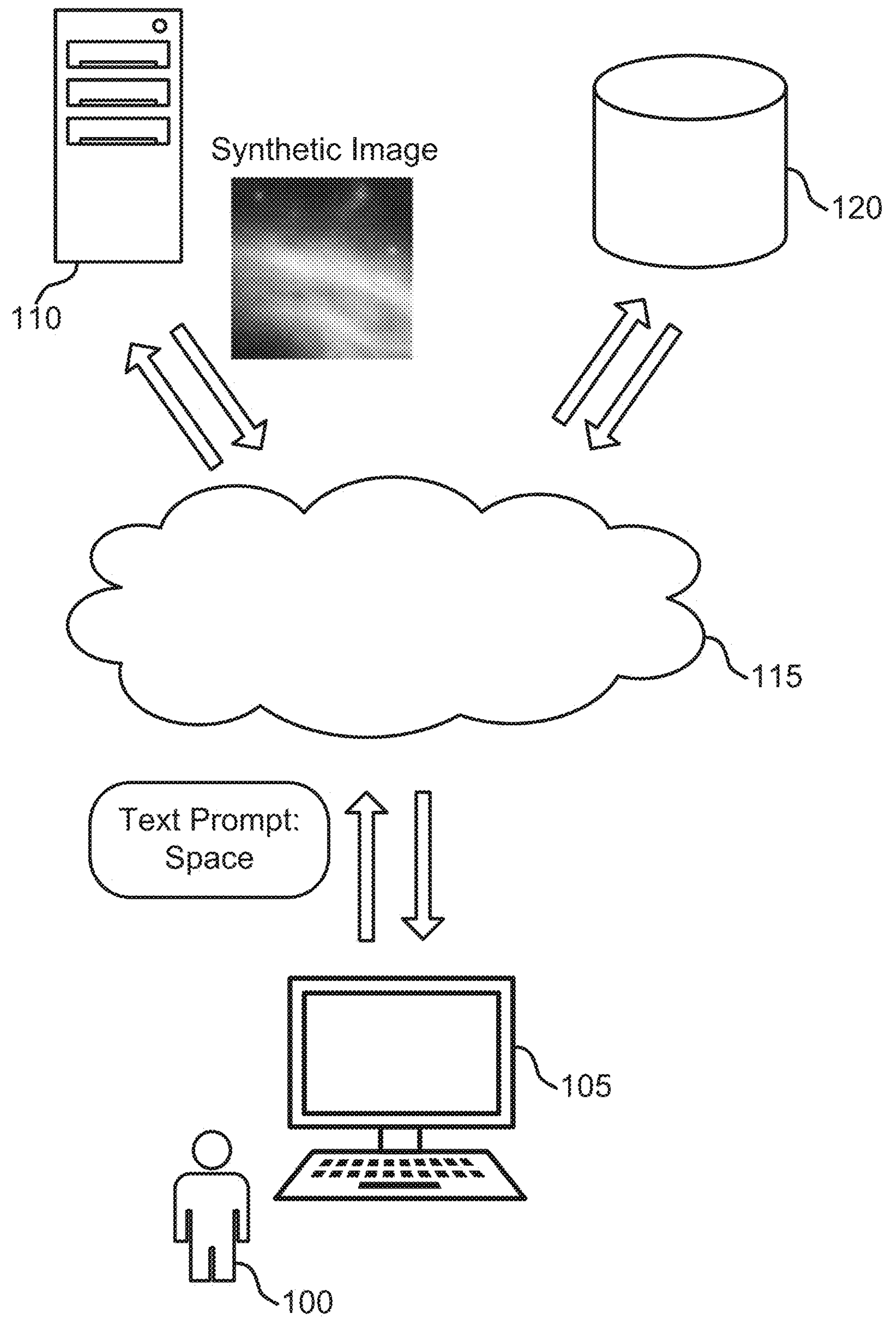
FIG. 1 shows an example of an image processing system according to aspects of the present disclosure.

Aspects of the present disclosure provide methods, non-transitory computer readable media, apparatuses, and systems for image processing. According to an aspect of the present disclosure, an image generation model is trained to generate a synthetic image based on a short text prompt. For example, the short text prompt has a length less than or equal to a threshold length. In some cases, the threshold length is four words, text tokens, or text characters. In some cases, a data preparation component is trained to obtain a training dataset including short text prompts and corresponding synthetic images. In some embodiments, the data preparation component divides captions of the synthetic images to obtain synthetic queries, which are used as short text prompts to train the image generation model. For example, the short text prompts and synthetic images are referred to as prompt-image pairs. In some cases, the prompt-image pairs are ranked based on semantic similarity scores. In some cases, the prompt-image pairs are ranked based on aesthetic scores. By training the image generation model with the ranked prompt-image pairs, embodiments of the present disclosure can generate a synthetic image having high aesthetics and semantic relevance based on an input of a short text prompt.

In some embodiments, the data preparation component includes an image sampling scheme, where the data preparation component is trained to retrieve a synthetic image from a search index, where the synthetic image is ranked higher in aesthetics and semantic relevance. Moreover, by training the image generation model with the image sampling scheme, embodiments of the present disclosure can learn the relationships between short text prompts and top-ranked synthetic images having high aesthetics and semantic relevance.

A subfield in image generation relates to text-to-image generation using diffusion models. In some cases, the conventional image generation models are trained with user-provided image-caption pairs, where the image generation relevance is highly dependent on the quality and diversity of the image-caption pairs that the model is trained on. For example, the image-caption pairs include descriptive captions provided by a user. When the conventional image generation models are trained based on these image-caption pairs, the conventional image generation models can generate images based on long descriptive text prompts.

However, since the conventional image generation models are not trained on short descriptive text captions, the conventional image generation models are unable to perform well when provided with short text prompts (for example, one or two tokens). In some cases, these conventional image generation models may generate images based on a short text prompt with some relevance, however, the aesthetics of the generated images are unsatisfactory compared to generated images based on longer prompts.

In some cases, a conventional image generation model expands a short prompt to a longer prompt to obtain more context. Then, the longer prompt is provided as input to the conventional image generation model to generate an image. Even though the longer prompt may provide better context for the conventional image generation model, the conventional image generation model fails to generate a synthetic image having high aesthetics.

In some cases, the conventional image generation model generates images that have poor aesthetics. For example, a short text prompt may indicate "Space." The conventional image generation model may generate an image depicting emptiness. For example, the image may include a fuzzy circle having dull colors. In some cases, the image may have lower resolutions. In some cases, the image may lack detail features that correspond to the short text prompt. Thus, the conventional image generation model fails to generate an image that has high aesthetic and semantic relevance that is more appealing to a user.

Accordingly, the present disclosure provides systems and methods that improve on conventional text-to-image generation models by generating a synthetic image having high aesthetics and semantic relevance based on an input of a short text prompt. In some cases, the synthetic image includes an additional element or feature not described by the short text prompt, where the additional element is semantically correlated to the short text prompt. For example, as shown in at least FIG. 3B, the image generation model of the present disclosure generates an image that is aesthetically more appealing than the conventional synthetic image. For example, the synthetic image depicts outer space (described by the short text prompt) with additional elements such as galaxies, gaseous clouds, stars, and planets. Additionally, the synthetic image has brighter colors, finer textures, better composition, and higher resolutions compared to images generated by the conventional image generation models. By training the image generation model with ranked short text prompt-image pairs, the image generation model is able to learn the relationship between short text prompts and synthetic images.

Some embodiments of the present disclosure include training an image generation model based on a training dataset including short text prompts describing an element in one or more images. Embodiments of the present disclosure further include a data preparation component trained to generate short text prompts by performing noun chunking on captions of images. In some embodiments, the short text prompt-image pairs are ranked based on a semantic similarity score. In some cases, the short text prompt-image pairs are further ranked based on an aesthetic score. By ranking the short text prompt-image pairs, image generation models can retrieve images having high aesthetics that correspond to a short text prompt provided, for example, by a user.

In some embodiments, the data preparation component can be used to augment existing image generation models or datasets having image-caption pairs. For example, the data preparation component can generate a training dataset from an existing dataset. In some cases, the training dataset includes short text prompt-image pairs. By combining the training dataset with an existing dataset, an image generation model is capable of generating images having high aesthetics and semantic relevance based on a short text prompt input.

By using the data preparation component, embodiments of the present disclosure can enhance image processing applications such as text-to-image generation, visual art design, storyboarding, and content creation by generating synthetic images that have high aesthetics and semantic relevance based on a short text prompt. For example, the short text prompt may include one or two tokens, one to two words, one to two characters, or a combination thereof. Additionally or alternatively, the data preparation component of the present disclosure can be used to complement (e.g., increase the performance of) different text-to-image generation models. By using the data preparation component of the present disclosure, the image generation model can generate synthetic images with increased diversity for short text prompt inputs. The data preparation component further includes training captions (with noisy user-contributed metadata) of images that can be used to train image generation models with an efficient data processing scheme.

Figure 3A:
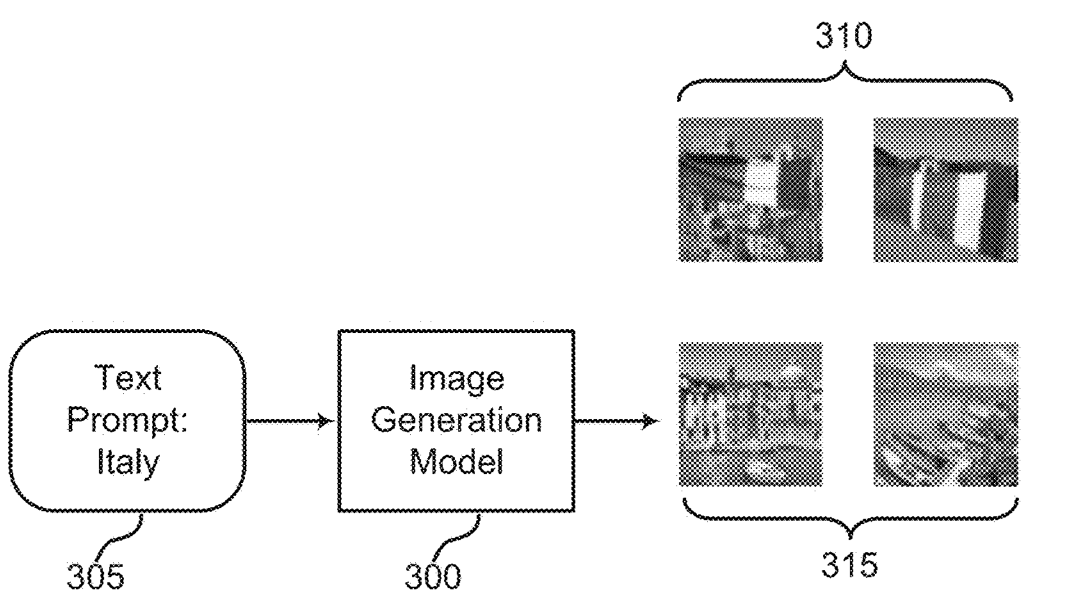
FIGS. 3A and 3B show examples of text prompt image generation according to aspects of the present disclosure.
Figure 3B:
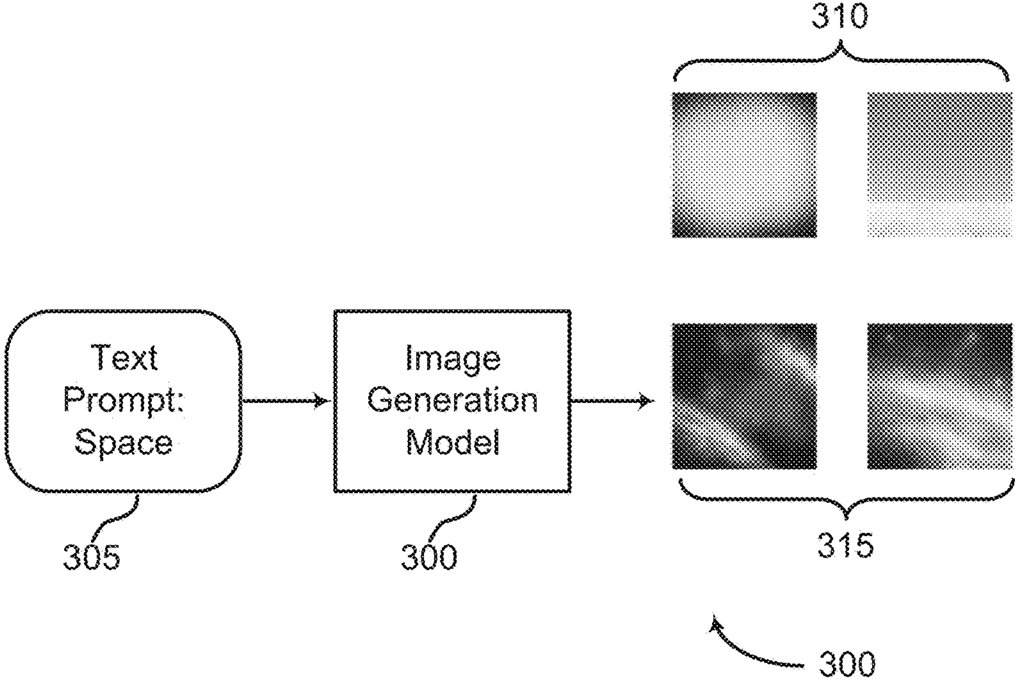

An example application of the inventive concept in image processing is provided with reference to FIGS. 2, 3A, and 3B. Details regarding the architecture of an image processing apparatus are provided with reference to FIGS. 5-7. An example of a process for image processing is provided with reference to FIG. 4. A description of an example training process is provided with reference to FIGS. 8-10.

Image Generation

In FIGS. 1-2, 3A, 3B, and 4, a method, apparatus, non-transitory computer readable medium, and system for image processing are described. One or more aspects of the method, apparatus, non-transitory computer readable medium, and system include obtaining a short text prompt. One or more aspects include selecting an image generation model based on a length of the short text prompt. In some cases, the image generation model is trained to generate images based on short text prompts using training data including text prompts below a threshold length. One or more aspects include generating, using the image generation model, a synthetic image based on the short text prompt. In some cases, the synthetic image includes an element described by the short text prompt. In some aspects, the length of the short text prompt is below the threshold length. In some cases, the short text prompt is referred to as the text prompt.

Some examples of the method, apparatus, non-transitory computer readable medium, and system further include obtaining a long text prompt. In some cases, a length of the long text prompt is greater than the threshold length. Some examples further include selecting an alternative image generation model based on the length of the long text prompt. In some cases, the long text prompt is referred to as an additional text prompt.

In some aspects, the synthetic image includes an additional element that is not described by the short text prompt. In some aspects, the additional element is correlated with a semantic meaning of the short text prompt in the training data.

Some examples of the method, apparatus, non-transitory computer readable medium, and system further include encoding, using a text encoder, the short text prompt to obtain a text embedding. In some cases, the image generation model receives the text embedding as an input. Some examples of the method, apparatus, non-transitory computer readable medium, and system further include performing a reverse diffusion process on a noisy input image based on the short text prompt.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 5.

Referring to FIG. 1, according to some aspects, user 100 provides a text prompt to image processing apparatus 110 via user device 105 and cloud 115. In some cases, the text prompt is a short text prompt including one or two words. For example, the text prompt states "Space." In some cases, the text prompt is a voiced-based statement or text-based statement. In some cases, image processing apparatus 110 generates a synthetic image based on the text prompt. The synthetic image depicts high semantic relevance and high aesthetics based on the text prompt. For example, the synthetic image in FIG. 1 depicts outer space with galaxies, gaseous clouds, stars, and planets. Additionally, the synthetic image has bright colors, fine textures, and high resolutions. In some cases, image processing apparatus 110 generates a synthetic image that includes one or more additional elements not described by the text prompt. For example, as shown in FIG. 1, the additional element includes the galaxies, gaseous clouds, stars, and planets. In some embodiments, image processing apparatus 110 displays the synthetic image to user 100 via user device 105 and cloud 115.

User device 105 may be a personal computer, laptop computer, mainframe computer, palmtop computer, personal assistant, mobile device, or any other suitable processing apparatus. In some examples, user device 105 includes software that incorporates an image detection application. In some examples, the image detection application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIG. 5. According to some aspects, image processing apparatus 110 includes a computer implemented network comprising a machine learning model, a text encoder, an adaptor network, and an image generation model. Image processing apparatus 110 further includes a processor unit, a memory unit, an I/O module, and a training component. In some embodiments, image processing apparatus 110 further includes a communication interface, user interface components, and a bus as described with reference to FIG. 11. Additionally, image processing apparatus 110 communicates with user device 105 and database 125 via cloud 115. Further detail regarding the operation of image processing apparatus 110 is provided with reference to FIGS. 2 and 4.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores training dataset including a plurality of short text prompts and a plurality of images. In some cases, database 120 stores the training dataset including a plurality of long text prompts and a plurality of additional images corresponding to the long text prompts. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

FIG. 2 shows an example of a method 200 for generating a synthetic image based on a text prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system provides a short text prompt. In some cases, the operations of this step refer to, or may be performed by, a user as described with reference to FIG. 1. In some cases, the operations of this step refer to, or may be performed by, a machine learning model as described with reference to FIGS. 5 and 9. In some cases, for example, the user provides a text prompt to the image processing apparatus (e.g., the image processing apparatus described with reference to FIGS. 1 and 5) via a user interface provided by the image processing apparatus on a user device (e.g., the user device described with reference to FIG. 1). For example, the short text prompt includes one or two words, one or two text tokens, one or two characters, or a combination thereof. For example, the short text prompt is a text-based input that states "Space." In some cases, the short text prompt is voice-based.

At operation 210, the system identifies an additional element not described by the short text prompt. In some cases, the operations of this step refer to, or may be performed by, an image processing apparatus as described with reference to FIGS. 1 and 5. In some cases, the operations of this step refer to, or may be performed by, a machine learning model as described with reference to FIGS. 5 and 9. In some cases, the additional element is semantically related to the short text prompt. For example, the additional element may include features such as galaxies, gaseous clouds, stars, and planets that complement the short text prompt "space." In some cases, the additional element is correlated to the short text prompt.

At operation 215, the system generates a synthetic image based on the short text prompt including the additional element. In some cases, the operations of this step refer to, or may be performed by, an image processing apparatus as described with reference to FIGS. 1 and 5. In some cases, the operations of this step refer to, or may be performed by, an image generation model as described with reference to FIGS. 3A, 3B, 5, 6, and 10. Synthetic image 315 is an example of, or includes aspects of, the corresponding element described with reference to FIGS. 3A, 3B, and 6. For example, the synthetic image depicting space includes the additional elements of galaxies, gaseous clouds, stars, and planets within the image composition. Further details on the synthetic image are described with reference to FIGS. 3A and 3B.

At operation 220, the system displays the synthetic image. In some cases, the operations of this step refer to, or may be performed by, an image processing apparatus as described with reference to FIGS. 1 and 5. In some cases, the synthetic image is displayed on a user device via a user interface of the image processing apparatus and cloud.

FIGS. 3A and 3B show examples of text prompt image generation according to aspects of the present disclosure. The example shown includes image generation model 300, text prompt 305, conventional synthetic image 310, and synthetic image 315. In some cases, text prompt 305 refers to a short text prompt.

Referring to FIGS. 3A and 3B, image generation model 300 receives text prompt 305 and generates synthetic image 315, in comparison with conventional synthetic image 310 generated by conventional image generation models. In some cases, synthetic image 315 includes one or more images. In some cases, text prompt 305 is provided by a user. For example, as shown in FIG. 3A, text prompt 305 states "Italy." Image generation model 300 generates synthetic image 315 that includes an element described by text prompt 305. For example, synthetic image 315 includes a place or a city in Italy. Additionally or alternatively, image generation model 300 generates synthetic image 315 that includes an additional element not described by text prompt 305, where the additional element is correlated to text prompt 305. For example, synthetic image 315 includes buildings in Italy, canals in Italy, and landscapes in Italy. In some cases, the building includes colors that are correlated to Italy. For example, the buildings include white color, green color, red color, or a combination thereof. In some cases, synthetic image 315 has high resolutions, fine details, composite compositions, fine textures, and excellent spatial arrangements.

Conventional image generation models generate conventional synthetic image 310 that might not be aesthetically appealing or semantically relevant. For example, as shown in FIG. 3A, conventional synthetic image 310 includes a flag of Italy that covers a significant amount of image space in conventional synthetic image 310. As a result, conventional synthetic image 310 is less aesthetically appealing, for example, to a user due to the poor image composition.

In a second example shown in FIG. 3B, text prompt 305 states "Space." A conventional image generation model may generate a conventional synthetic image 310 that has poor composition, poor color, and poor depiction of text prompt 305 (e.g., space). Additionally, conventional synthetic image 310 lacks visual attraction as a result of lack of detail or finesse, blurriness, distortion, color imbalance, and/or lack of contrast and exposure. Additionally, conventional synthetic image 310 fails to include additional elements correlated to text prompt 305 that help to increase the aesthetic of the overall image composition.

On the contrary, image generation model 300 of the present disclosure is able to generate the synthetic image 315 which has both high aesthetics and high semantic relevance. For example, as shown in FIG. 3B, synthetic image 315 depicts outer space (described by text prompt 305) with additional elements correlated to text prompt 305 such as galaxies, gaseous clouds, stars, and planets. Additionally, synthetic image 315 has brighter colors, finer textures, better composition, and higher resolutions compared to conventional synthetic image 310. In some aspects, the aesthetics of an image are evaluated based on image quality, details, resolution, composition, color, tone, scene, and relevance. In some cases, for example, the aesthetics of an image is evaluated based on human feedback.

Image generation model 300 is an example of, or includes aspects of, the corresponding element described with reference to FIGS. 5, 6, and 10. Text prompt 305 is an example of, or includes aspects of, the corresponding element described with reference to FIGS. 6 and 7. Synthetic image 315 is an example of, or includes aspects of, the corresponding element described with reference to FIG. 6.

Figure 4:
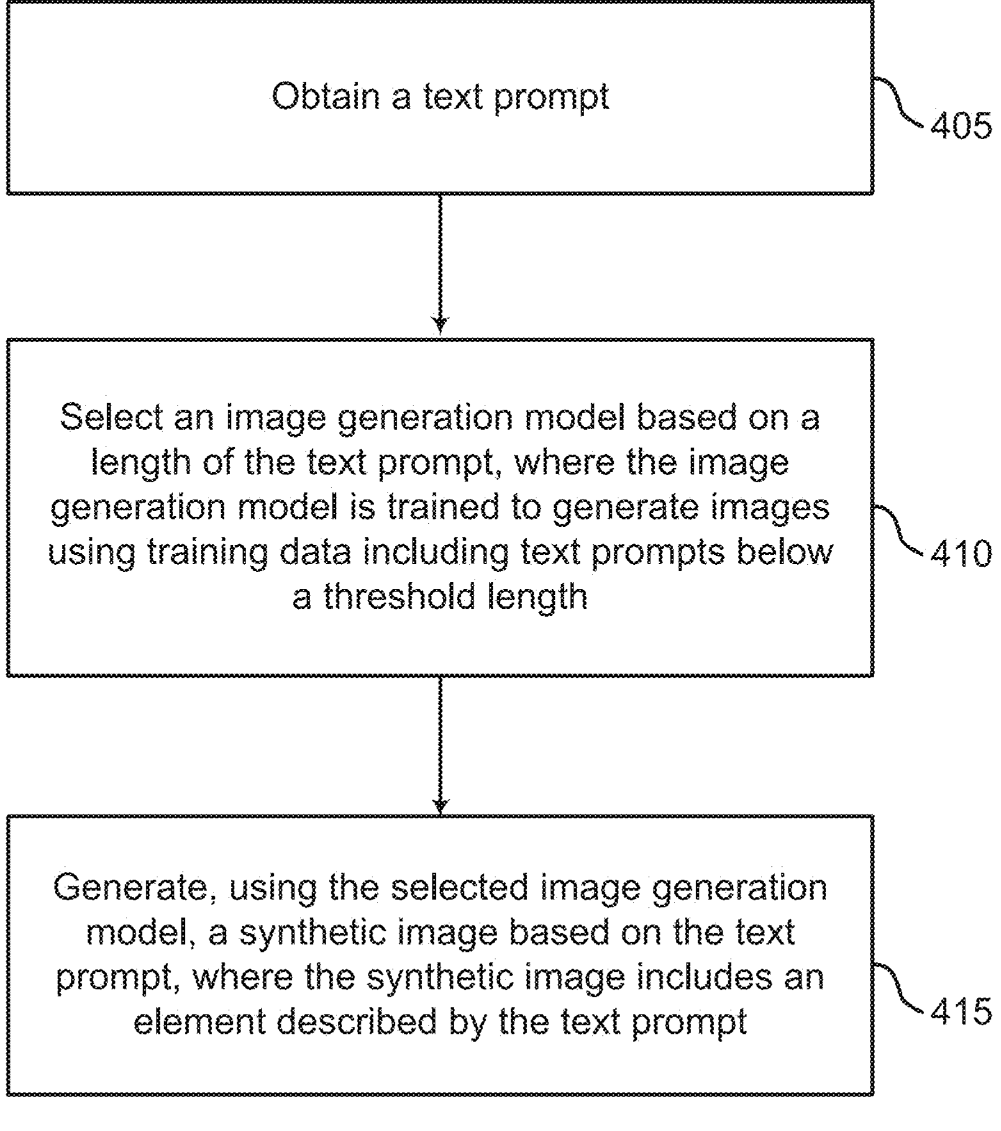
FIG. 4 shows an example of a method for generating a synthetic image based on a text prompt according to aspects of the present disclosure.

FIG. 4 shows an example of a method 400 for generating a synthetic image based on a text prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains a text prompt. In some cases, the operations of this step refer to, or may be performed by, a machine learning model as described with reference to FIGS. 5 and 9. In some cases, the operations of this step refer to, or may be performed by, a user as described with reference to FIG. 1. In some cases, for example, the user provides a text prompt to the image processing apparatus (e.g., the image processing apparatus described with reference to FIGS. 1 and 5) via a user interface provided by the image processing apparatus on a user device (e.g., the user device described with reference to FIG. 1). For example, the short text prompt includes one or two words, one or two text tokens, one or two characters, or a combination thereof. For example, the short text prompt is a text-based input that states "Space." In some cases, the short text prompt is voice-based.

At operation 410, the system selects an image generation model based on a length of the text prompt, where the image generation model is trained to generate images using training data including text prompts below a threshold length. In some cases, the operations of this step refer to, or may be performed by, a machine learning model as described with reference to FIGS. 5 and 9. For example, a machine learning model may include the image generation model trained to generate a synthetic image based on a short text prompt having a length less than or equal to a threshold length. For example, the threshold length may be four words, text tokens, or text characters. In some cases, a second image generation model receives a text prompt having a length longer than the threshold. In some cases, the image generation model can generate a synthetic image based on a short text prompt or a long text prompt.

In some embodiments, the short text prompt of the training data is obtained by performing noun chunking on captions of images. For example, the machine learning model receives an image-caption pair. The machine learning model divides the caption of the image into one or more noun chunks, where the noun chunks describe an element of the image. The image is ranked based on a semantic similarity score between a word embedding of a noun chunk and an image embedding of the image. The image is further ranked based on an aesthetics score. An aesthetic score is generated based on perceived aesthetics using an aesthetic evaluation model. In some cases, an aesthetic score is generated using a classifier. In some cases, an aesthetic score is generated based on human evaluation.

At operation 415, the system generates, using the image generation model, a synthetic image based on the text prompt, where the synthetic image includes an element described by the text prompt. In some cases, the operations of this step refer to, or may be performed by, an image generation model as described with reference to FIGS. 3A, 3B, 5, 6, and 10. For example, the synthetic image includes a feature described by the short text prompt. In some cases, the synthetic image includes an additional element not described by the short text prompt. For example, the additional element is correlated to the short text prompt. Further details on the synthetic image are described with reference to FIGS. 3A, 3B, and 6.

System Architecture

Figure 5:
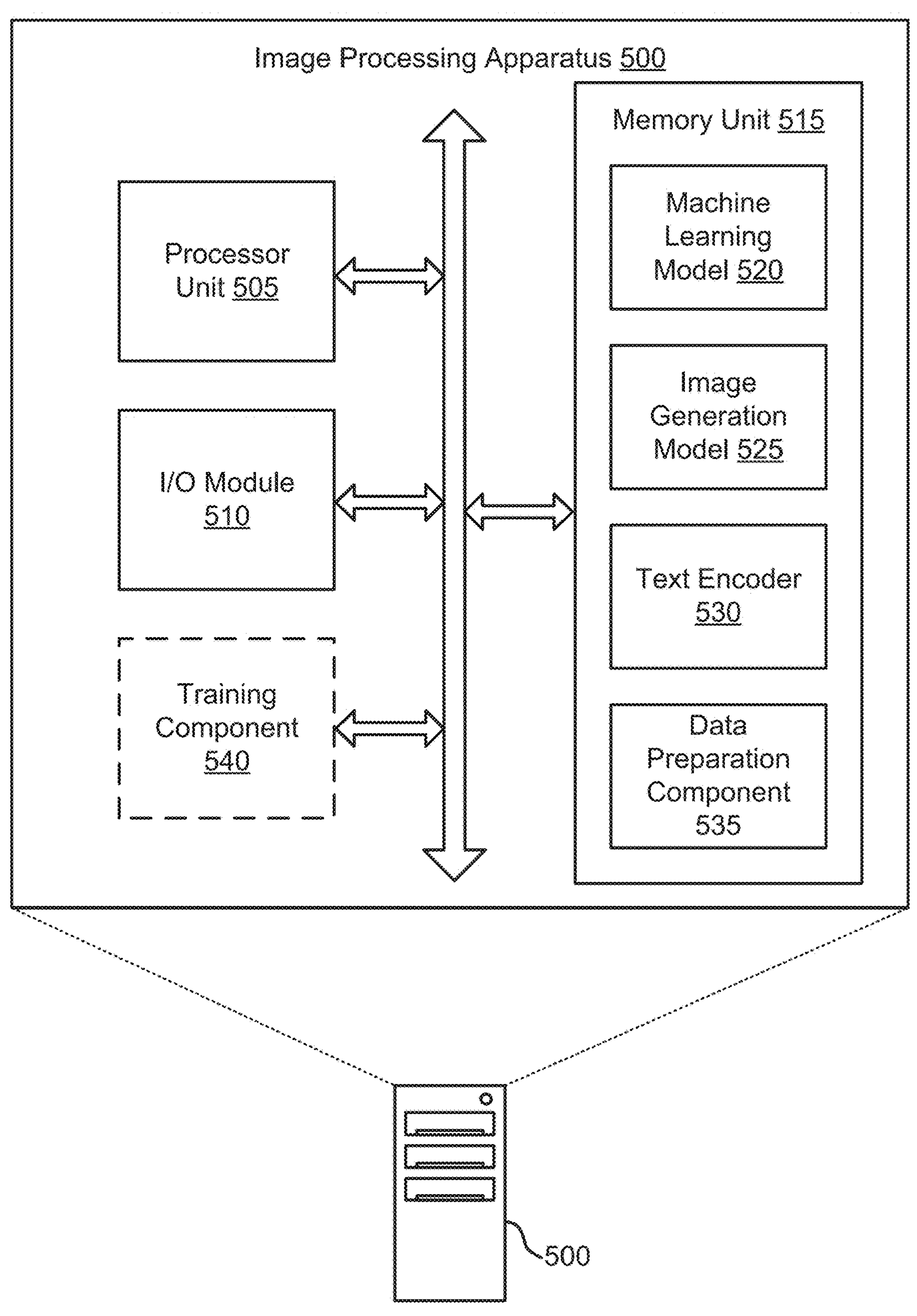
FIG. 5 shows an example of an image processing apparatus according to aspects of the present disclosure.
Figure 6:
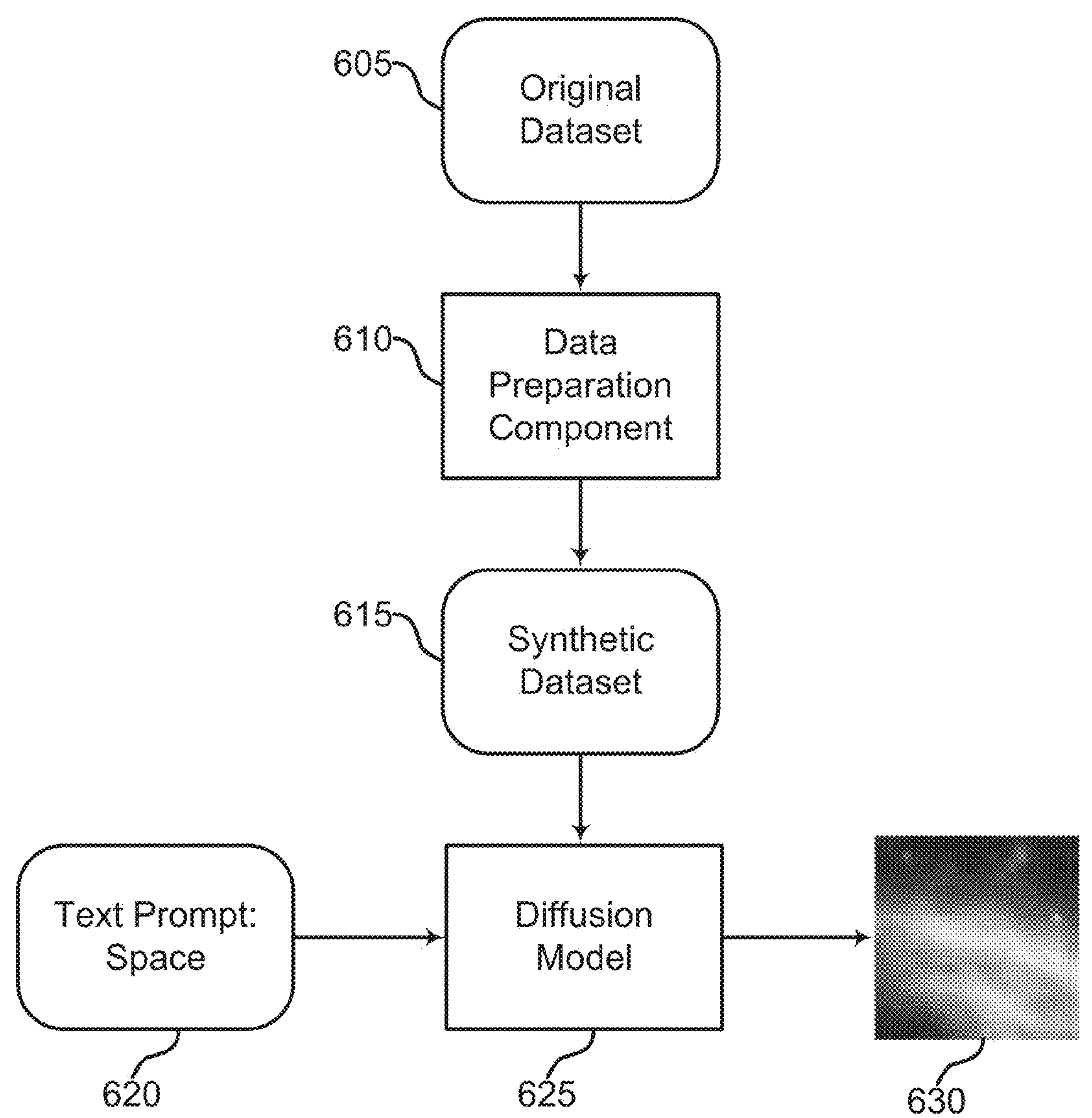
FIG. 6 shows an example of an image generation model according to aspects of the present disclosure.
Figure 7:
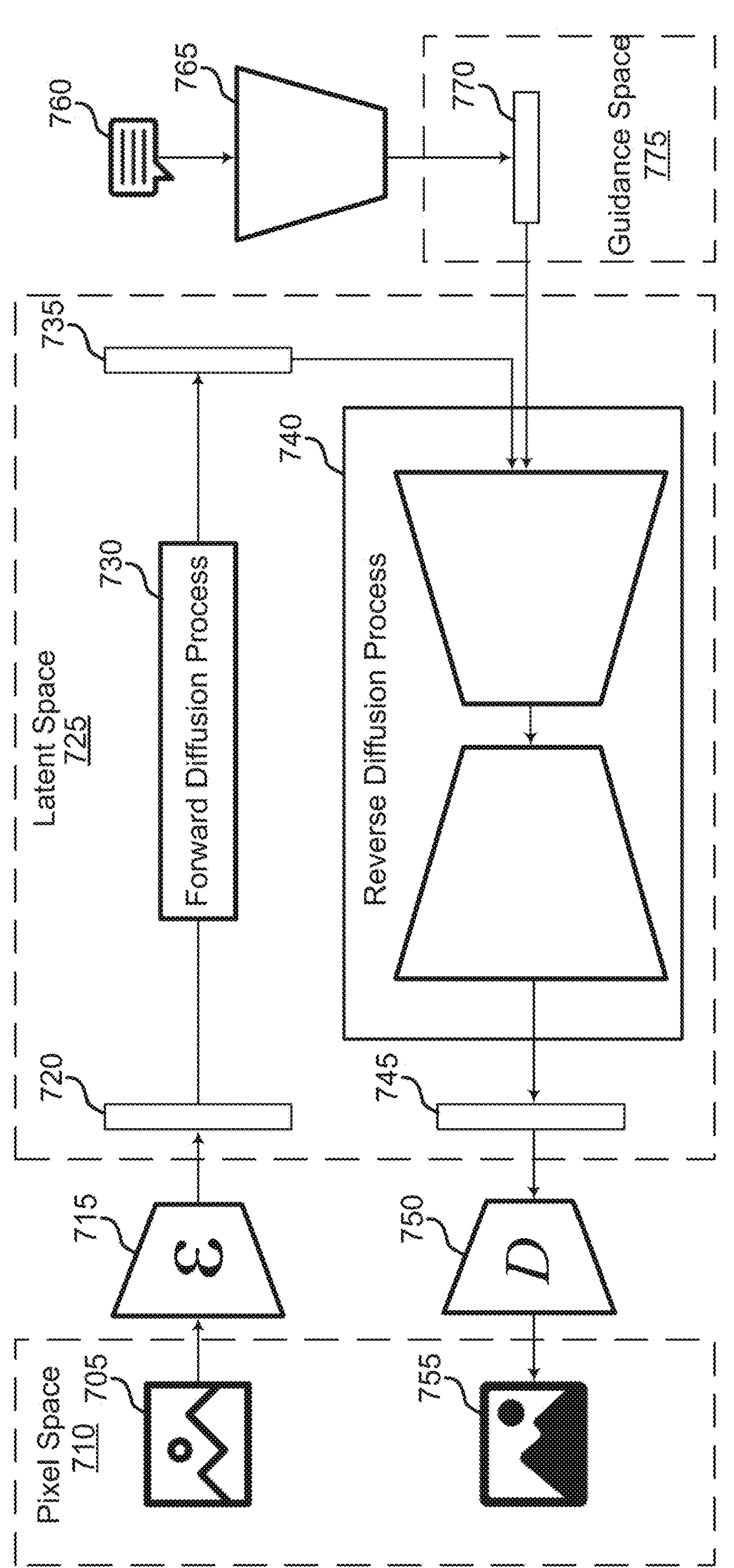
FIG. 7 shows an example of a diffusion model according to aspects of the present disclosure.

In FIGS. 5-7, an apparatus, system, and method for image processing are described. One or more aspects of the apparatus, system, and method include at least one processor and at least one memory storing instructions and in electronic communication with the at least one processor. One or more aspects include an image generation model comprising parameters stored in the at least one memory and trained to generate synthetic images including an element based on training data including a short text prompt describing the element and an image including the element described in the short text prompt. In some cases, the short text prompt is selected based on having a length less than a threshold length.

Some examples of the apparatus, system, and method further include a text encoder comprising parameters stored in the at least one memory and trained to encode the short text prompt to obtain a text embedding. In some aspects, the image generation model is a diffusion model. Some examples of the apparatus, system, and method further include a data preparation component comprising parameters stored in the at least one memory and trained to obtain training data including a plurality of short text prompts and a plurality of images.

FIG. 5 shows an example of an image processing apparatus 500 according to aspects of the present disclosure. The example shown includes image processing apparatus 500, processor unit 505, I/O module 510, memory unit 515, and training component 540. Image processing apparatus 500 is an example of, or includes aspects of, the corresponding element described with reference to FIG. 1. In one aspect, memory unit 515 includes machine learning model 520, image generation model 525, text encoder 530, and data preparation component 535. In one aspect, machine learning model 520 includes image generation model 525, text encoder 530, and data preparation component 535.

According to some embodiments of the present disclosure, image processing apparatus 500 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, image processing apparatus 500 includes a computer-implemented convolutional neural network (CNN). CNN is a class of neural network commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit 505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 11.

I/O module 510 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 510 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 11.

In one aspect, memory unit 515 includes instructions executable by processor unit 505. In one aspect, memory unit 515 includes machine learning model 520 or stores parameters of machine learning model 520. In one aspect, memory unit 515 includes machine learning model 520, image generation model 525, text encoder 530, and data preparation component 535.

According to some aspects, machine learning model 520 obtains a short text prompt. In some examples, machine learning model 520 selects an image generation model 525 based on a length of the short text prompt, where the image generation model 525 is trained to generate images based on short text prompts using training data including text prompts below a threshold length. In some aspects, the length of the short text prompt is below the threshold length.

In some examples, machine learning model 520 obtains a long text prompt, where a length of the long text prompt is greater than the threshold length. In some examples, machine learning model 520 selects an alternative image generation model based on the length of the long text prompt. In some aspects, the synthetic image includes an additional element that is not described by the short text prompt. In some aspects, the additional element is correlated with a semantic meaning of the short text prompt in the training data.

In one aspect, machine learning model 520 includes image generation model 525, text encoder 530, and data preparation component 535. In some cases, machine learning model 520 is a computational algorithm, model, or system designed to recognize patterns, make predictions, or perform a specific task (for example, image processing) without being explicitly programmed. Machine learning model 520 is an example of, or includes aspects of, the corresponding element described with reference to FIG. 9.

According to some aspects, image generation model 525 generates a synthetic image based on the short text prompt, where the synthetic image includes an element described by the short text prompt. In some examples, image generation model 525 performs a reverse diffusion process on a noisy input image based on the short text prompt.

In some aspects, the image generation model 525 is trained to generate the synthetic images to include the additional element based on text prompts describing the element. In some examples, image generation model 525 generates a predicted image.

According to some aspects, image generation model 525 comprises parameters stored in the at least one memory and trained to generate synthetic images including an element based on training data including a short text prompt describing the element and an image including the element described in the short text prompt, wherein the short text prompt is selected based on having a length less than a threshold length. In some aspects, the image generation model 525 is a diffusion model. Image generation model 525 is an example of, or includes aspects of, the corresponding element described with reference to FIGS. 3A, 3B, 6, and 10.

According to some aspects, text encoder 530 encodes the short text prompt to obtain a text embedding, where the image generation model 525 receives the text embedding as an input. According to some aspects, text encoder 530 comprises parameters stored in the at least one memory and trained to encode the short text prompt to obtain a text embedding. Text encoder 530 is an example of, or includes aspects of, the corresponding element described with reference to FIG. 7.

According to some aspects, data preparation component 535 obtains training data including a short text prompt describing an element and an image including the element described in the short text prompt, where the short text prompt is selected based on having a length less than a threshold length. In some aspects, the image includes an additional element that is not described by the short text prompt.

In some examples, data preparation component 535 obtains a caption for the image. In some examples, data preparation component 535 removes one or more words from the caption to obtain the short text prompt. In some examples, data preparation component 535 divides the caption into a set of noun chunks. In some examples, data preparation component 535 generates a set of short text prompts based on the set of noun chunks. In some examples, data preparation component 535 performs an image search based on the short text prompt to obtain a set of candidate images, where the training data is based on the set of candidate images.

In some examples, data preparation component 535 generates a semantic similarity score for each of the set of candidate images, where the training data is based on the semantic similarity score. In some examples, data preparation component 535 generates an aesthetic score for each of the set of candidate images, where the training data is based on the aesthetic score.

According to some aspects, data preparation component 535 is configured to obtain training data including a plurality of short text prompts and a plurality of images. In some aspects, data preparation component 535 comprises parameters stored in the at least one memory and trained to obtain training data including a plurality of short text prompts and a plurality of images. Data preparation component 535 is an example of, or includes aspects of, the corresponding element described with reference to FIGS. 6, 9, and 10.

According to some aspects, training component 540 trains an image generation model 525 to generate synthetic images including the element based on the training data. In some aspects, the training data includes a long text prompt having a length greater than the threshold length and an additional image corresponding to the long text prompt. In some examples, training component 540 identifies a target ratio of short text prompts to long text prompts. In some examples, training component 540 samples the training data based on the target ratio. In some examples, training component 540 computes a loss function based on the image and the predicted image.

According to some embodiments, training component 540 is implemented as software stored in memory unit 515 and executable by a processor in processor unit 505 of a separate computing device, as firmware in the separate computing device, as one or more hardware circuits of the separate computing device, or as a combination thereof. In some examples, training component 540 is part of another apparatus other than image processing apparatus 500 and communicates with the image processing apparatus 500. In some examples, training component 540 is part of image processing apparatus 500.

FIG. 6 shows an example of an image generation model 600 according to aspects of the present disclosure. The example shown includes image generation model 600, original dataset 605, data preparation component 610, synthetic dataset 615, text prompt 620, diffusion model 625, and synthetic image 630.

Referring to FIG. 6, data preparation component 610 obtains an original dataset 605 and generates synthetic dataset 615. For example, original dataset 605 includes a plurality of image-caption pairs. The captions describe one or more elements of the image. In some cases, captions are long and complex. Captions contain useful information regarding the image. In some cases, for example, captions are provided by a user. In some cases, for example, captions include annotation data generated by a machine learning model.

In some embodiments, data preparation component 610 divides the captions into one or more noun chunks. For example, one or more words of the captions may be removed or pruned to generate the one or more noun chunks. In some cases, each of the noun chunks describes an element of the corresponding image. In some cases, the noun chunks are used as short text training prompts to train image generation model 600. Synthetic dataset 615 includes short text training prompts (sometimes referred to as synthetic queries) and corresponding images. In some cases, the synthetic queries are ranked based on a semantic similarity score and an aesthetics score. In one aspect, diffusion model 625 is trained using synthetic dataset 615. Further details on generating synthetic dataset 615 are described with reference to FIG. 9.

Embodiments of the present disclosure include image generation model 600 conditioned based on text prompt 620 (e.g., a short text prompt having a length less than or equal to the threshold length of four tokens or words). In some cases, image generation model 600 is trained using user search data from a database, such as database 120 described with reference to FIG. 1, where the user search data includes queries and corresponding synthetic images. In one embodiment, image generation model 600 is trained with training data in Adobe® Stock. However, in some cases, the user search data might not have enough query-image pairs, including a query with less than or equal to four tokens. Accordingly, data preparation component 610 divides captions associated with an image to obtain synthetic queries. Additionally or alternatively, data preparation component 610 can complement other image generation models by generating training dataset with short text prompts.

In some embodiments, text prompt 620 is provided to diffusion model 625. For example, text prompt 620 states "Space." Diffusion model 625 generates synthetic image 630 based on text prompt 620. In some cases, synthetic image 630 includes an element described by text prompt 620. For example, synthetic image 630 illustrates space or outer space, which is described by text prompt 620. Additionally or alternatively, synthetic image 630 includes an additional element not described by the short text prompt. The additional element is correlated with a semantic meaning of text prompt 620. For example, synthetic image 630 includes one or more additional elements such as galaxies, gaseous clouds, stars, and planets. Each of the additional elements is correlated with a semantic meaning of the element described by text prompt 620. In some cases, the semantic relationship is obtained when data preparation component 610 generates noun chunks from synthetic dataset 615 based on image captions of original dataset 605. For example, when one or more words of the image captions are removed or pruned to generate the noun chunks, each of the noun chunks may include a semantic relationship among one another. In some cases, the image generation model 600 includes pre-trained data with semantic correlations or semantic relationships.

In some embodiments, a text encoder or a multimodal encoder encodes text prompt 620 to obtain a text embedding. Diffusion model 625 receives the text embedding as input and generates synthetic image 630. As used herein, the term "embedding" refers to a numerical representation of words, sentences, documents, or images in a vector space. The embedding is used to encode semantic meaning, relationships, and context of the words, sentences, documents, or images where the encoding can be processed by a machine learning model.

In some embodiments, diffusion model 625 performs a reverse diffusion process on a noisy input image based on text prompt 620. For example, text prompt 620 is used as a guidance prompt during the reverse diffusion process, so that the output image or synthetic image includes the element described by text prompt 620. In one aspect, diffusion model 625 is a pixel diffusion model. In one aspect, diffusion model 625 is a latent diffusion model. Further details on the reverse diffusion process are described with reference to FIG. 7.

Image generation model 600 is an example of, or includes aspects of, the corresponding element described with reference to FIGS. 3A, 3B, 5, and 10. Original dataset 605 is an example of, or includes aspects of, the corresponding element described with reference to FIG. 9. Data preparation component 610 is an example of, or includes aspects of, the corresponding element described with reference to FIGS. 5, 9, and 10.

Synthetic dataset 615 is an example of, or includes aspects of, the corresponding element described with reference to FIG. 9. Text prompt 620 is an example of, or includes aspects of, the corresponding element described with reference to FIGS. 3A, 3B, and 7. Diffusion model 625 is an example of, or includes aspects of, the corresponding element described with reference to FIG. 7. Synthetic image 630 is an example of, or includes aspects of, the corresponding element described with reference to FIGS. 3A and 3B.

FIG. 7 shows an example of a diffusion model 700 according to aspects of the present disclosure. The example shown includes diffusion model 700, original image 705, pixel space 710, image encoder 715, original image feature 720, latent space 725, forward diffusion process 730, noisy feature 735, reverse diffusion process 740, denoised image feature 745, image decoder 750, output image 755, text prompt 760, text encoder 765, guidance feature 770, and guidance space 775. In some cases, diffusion model 700 is a guided diffusion model. Diffusion model 700 is an example of, or includes aspects of, the image generation model described with reference to FIGS. 3A, 3B, 5-6, and 10.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Diffusion models work by iteratively adding noise to the data during a forward process and then learning to recover the data by denoising the data during a reverse process. For example, during training, diffusion model 700 may take an original image 705 in a pixel space 710 as input and apply an image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain the denoised image features 745 in latent space 725. In some examples, denoised image features 745 are compared to the original image features 720 at each of the various noise levels, and parameters of the reverse diffusion process 740 of the diffusion model are updated based on the comparison. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740. In some cases, output image 755 refers to synthetic image (e.g., described with reference to FIGS. 3A, 3B, and 6).

In some cases, image encoder 715 and image decoder 750 are pre-trained prior to training the reverse diffusion process 740. In some examples, image encoder 715 and image decoder 750 are trained jointly, or the image encoder 715 and image decoder 750 are fine-tuned jointly with the reverse diffusion process 740.

The reverse diffusion process 740 can also be guided based on a text prompt 760, or another guidance prompt, such as an image, a layout, a style, a color, a segmentation map, etc. The text prompt 760 can be encoded using a text encoder 765 (e.g., a multimodal encoder) to obtain guidance features 770 in guidance space 775. The guidance features 770 can be combined with the noisy features 735 at one or more layers of the reverse diffusion process 740 to ensure that the output image 755 includes content described by the text prompt 760. For example, guidance feature 770 can be combined with the noisy feature 735 using a cross-attention block within the reverse diffusion process 740. In some cases, text prompt 760 refers to short text prompt (e.g., described with reference to FIGS. 3A, 3B, and 6).

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 760) describing content to be included in a generated image. For example, a user may provide the prompt "Space". In some examples, guidance can be provided in a form other than text, such as via an image, a sketch, a color, a style, or a layout. The system converts text prompt 760 (or other guidance) into a conditional guidance vector or other multi-dimensional representation. For example, text may be converted into a vector or a series of vectors using a transformer model, or a multimodal encoder. In some cases, the encoder for the conditional guidance is trained independently of the diffusion model.

A transformer, transformer model, or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give every word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

The term "self-attention" refers to a machine learning model in which representations of the input interact with each other to determine attention weights for the input. Self-attention can be distinguished from other attention models because the attention weights are determined at least in part by the input itself.

A noise map is initialized that includes random noise. The noise map may be in a pixel space or a latent space. By initializing an image with random noise, different variations of an image including the content described by the conditional guidance can be generated. Then, the diffusion model 700 generates an image based on the noise map and the conditional guidance vector.

A diffusion process can include both a forward diffusion process 730 for adding noise to an image (e.g., original image 705) or features (e.g., original image feature 720) in a latent space 725 and a reverse diffusion process 740 for denoising the images (or features) to obtain a denoised image (e.g., output image 755). The forward diffusion process 730 can be represented as $q(x_t|x_{t-1})$, and the reverse diffusion process 740 can be represented as $p(x_{t-1}|x_t)$. In some cases, the forward diffusion process 730 is used during training to generate images with successively greater noise, and a neural network is trained to perform the reverse diffusion process 740 (e.g., to successively remove the noise).

In an example forward diffusion process 730 for a latent diffusion model (e.g., diffusion model 700), the diffusion model 700 maps an observed variable $x_0$ (either in a pixel space 710 or a latent space 725) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 740. During the reverse diffusion process 740, the diffusion model 700 begins with noisy data $x_T$, such as a noisy image and denoises the data to obtain the $p(x_{t-1}|x_t)$. At each step t−1, the reverse diffusion process 740 takes $x_t$, such as the first intermediate image, and t as input. Here, t represents a step in the sequence of transitions associated with different noise levels, The reverse diffusion process 740 outputs $x_{t-1}$, such as the second intermediate image iteratively until $x_T$ is reverted back to $x_0$, the original image 705. The reverse diffusion process 740 can be represented as:

$$p_\theta(x_{t-1} \mid x_t) := N\left(x_{t-1}; \mu_\theta(x_t, t), \sum\nolimits_\theta(x_t, t)\right). \quad (1)$$

The joint probability of a sequence of samples in the Markov chain can be written as a product of conditionals and the marginal probability:

$$x_T: p_\theta(x_{0:T}) := p(x_T)\prod\nolimits_{t=1}^{T} p_\theta(x_{t-1} \mid x_t), \quad (2)$$

where $p(x_T)=N(x_T; 0, I)$ is the pure noise distribution as the reverse diffusion process 740 takes the outcome of the forward diffusion process 730, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At interference time, observed data $x_0$ in a pixel space can be mapped into a latent space 725 as input and a generated data $\tilde{x}$ is mapped back into the pixel space 710 from the latent space 725 as output. In some examples, $x_0$ represents an original input image with low image quality, latent variables $x_1, \ldots, x_T$ represent noisy images, and $\tilde{x}$ represents the generated image with high image quality.

A diffusion model 700 may be trained using both a forward diffusion process 730 and a reverse diffusion process 740. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process 730 in N stages. In some cases, the forward diffusion process 730 is a fixed process where Gaussian noise is successively added to an image. In latent diffusion models, the Gaussian noise may be successively added to features (e.g., original image features 720) in a latent space 725.

At each stage n, starting with stage N, a reverse diffusion process 740 is used to predict the image or image features at stage n−1. For example, the reverse diffusion process 740 can predict the noise that was added by the forward diffusion process 730, and the predicted noise can be removed from the image to obtain the predicted image. In some cases, an original image 705 is predicted at each stage of the training process.

The training component (e.g., training component described with reference to FIG. 5) compares predicted image (or image features) at stage n−1 to an actual image (or image features), such as the image at stage n−1 or the original input image. For example, given observed data x, the diffusion model 700 may be trained to minimize the variational upper bound of the negative log-likelihood $-\log p_\theta(x)$ of the training data. The training system then updates parameters of the diffusion model 700 based on the comparison. For example, parameters of a U-Net may be updated using gradient descent. Time-dependent parameters of the Gaussian transitions can also be learned.

Diffusion model 700 is an example of, or includes aspects of, the corresponding element described with reference to FIG. 6. Text prompt 760 is an example of, or includes aspects of, the corresponding element described with reference to FIGS. 3A, 3B, and 6. Text encoder 765 is an example of, or includes aspects of, the corresponding element described with reference to FIG. 5.

Training and Evaluation

A method, apparatus, non-transitory computer readable medium, and system for image processing are described. One or more aspects of the method, apparatus, non-transitory computer readable medium, and system include obtaining training data including a short text prompt describing an element and an image including the element described in the short text prompt. In some cases, the short text prompt is selected based on having a length less than a threshold length. One or more aspects include training an image generation model to generate synthetic images including the element based on the training data.

In some aspects, the image includes an additional element that is not described by the short text prompt. In some aspects, the image generation model is trained to generate the synthetic images to include the additional element based on text prompts describing the element. Some examples of the method, apparatus, non-transitory computer readable medium, and system further include obtaining a caption for the image. Some examples further include removing one or more words from the caption to obtain the short text prompt.

Some examples of the method, apparatus, non-transitory computer readable medium, and system further include dividing the caption into a plurality of noun chunks. Some examples further include generating a plurality of short text prompts based on the plurality of noun chunks. Some examples of the method, apparatus, non-transitory computer readable medium, and system further include performing an image search based on the short text prompt to obtain a plurality of candidate images, wherein the training data is based on the plurality of candidate images.

Some examples of the method, apparatus, non-transitory computer readable medium, and system further include generating a semantic similarity score for each of the plurality of candidate images, wherein the training data is based on the semantic similarity score. Some examples of the method, apparatus, non-transitory computer readable medium, and system further include generating an aesthetic score for each of the plurality of candidate images, wherein the training data is based on the aesthetic score.

In some aspects, the training data includes a long text prompt having a length greater than the threshold length and an additional image corresponding to the long text prompt. Some examples of the method, apparatus, non-transitory computer readable medium, and system further include identifying a target ratio of short text prompts to long text prompts. Some examples further include sampling the training data based on the target ratio.

Some examples of the method, apparatus, non-transitory computer readable medium, and system further include generating a predicted image using the image generation model. Some examples further include computing a loss function based on the image and the predicted image.

Figure 8:
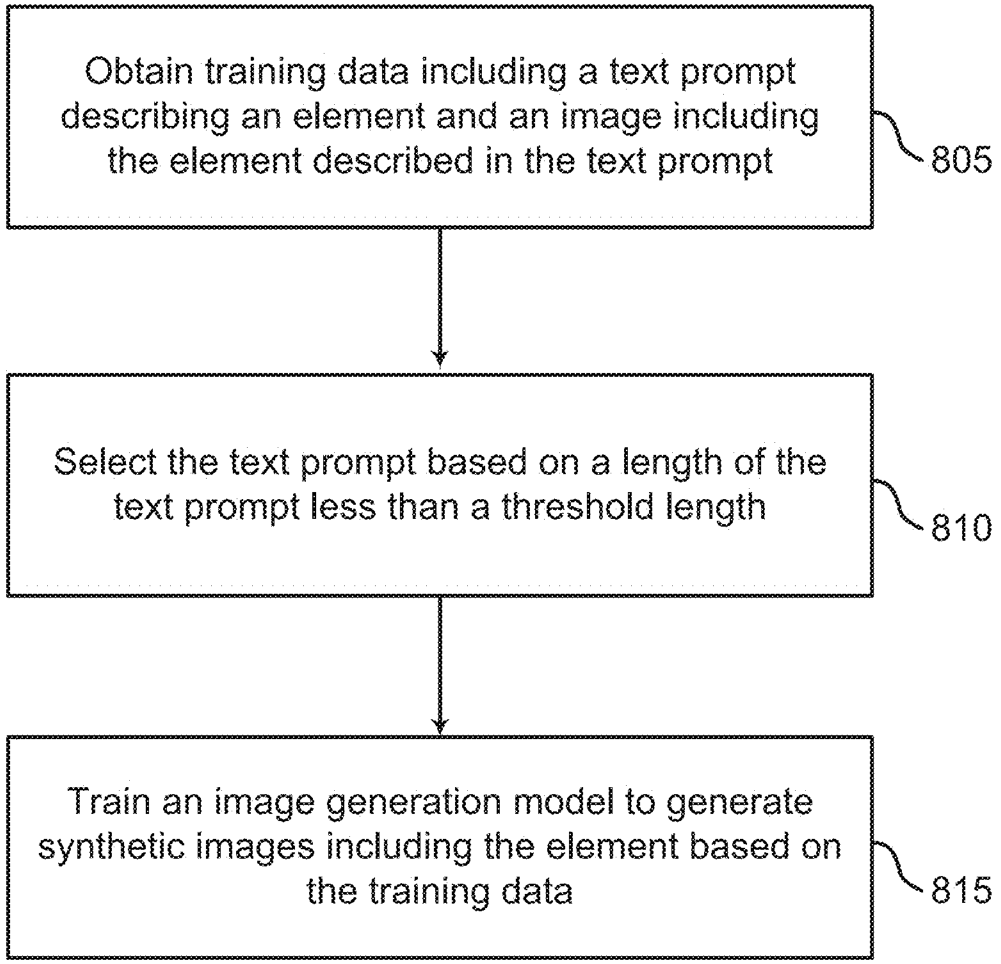
FIG. 8 shows an example of a method for training an image generation model according to aspects of the present disclosure.

FIG. 8 shows an example of a method 800 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains training data including a text prompt describing an element and an image including the element described in the text prompt. In some cases, the operations of this step refer to, or may be performed by, a data preparation component as described with reference to FIGS. 5, 6, 9, and 10. In some cases, for example, the short text prompt is obtained by dividing an image caption of the image into noun chunks. For example, the short prompt describes an element of the image. In some cases, the training data is stored in a database, for example, the database described with reference to FIG. 1. In some cases, the training data is stored in the data preparation component.

At operation 810, the system selects the text prompt based on a length of the text prompt less than a threshold length. In some cases, the operations of this step refer to, or may be performed by, a machine learning model as described with reference to FIGS. 5 and 9. In some cases, for example, a length of the short text prompts is less than or equal to the threshold length of four words, four tokens, or four characters. However, embodiments of the present invention are not necessarily limited to the example threshold length.

At operation 815, the system trains an image generation model to generate synthetic images including the element based on the training data. In some cases, the operations of this step refer to, or may be performed by, a training component as described with reference to FIG. 5. In some cases, the image generation model uses the short text prompt as a guidance prompt to generate the synthetic image. Training the image generation model is an example of, or includes aspects of, training a diffusion model described with reference to FIG. 7.

Figure 9:
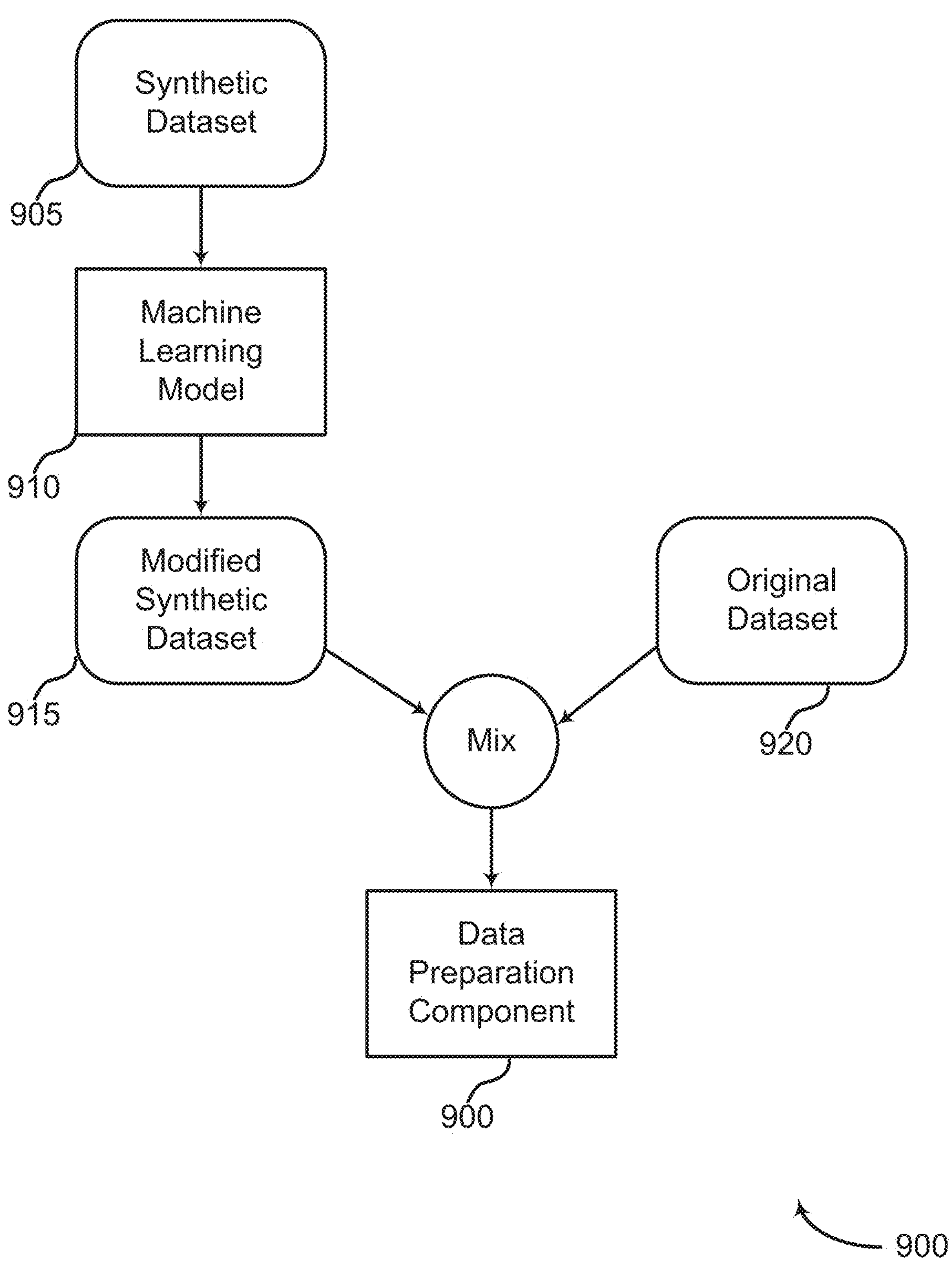
FIG. 9 shows an example of a data preparation component according to aspects of the present disclosure.

FIG. 9 shows an example of a data preparation component 900 according to aspects of the present disclosure. The example shown includes data preparation component 900, synthetic dataset 905, machine learning model 910, modified synthetic dataset 915, and original dataset 920.

Referring to FIG. 9, synthetic dataset 905 includes synthetic queries ranked based on a semantic similarity score and an aesthetics score. For example, the synthetic queries (described with reference to FIG. 6) and the corresponding images (may be referred to as synthetic behavior dataset) are ranked jointly. First, the synthetic behavior dataset is ranked based on semantic relevance by using a multi-modal model. In one aspect, the multi-modal model encodes the one or more synthetic queries to obtain one or more text embeddings and encodes a corresponding image to obtain an image embedding. The multi-modal model computes a semantic similarity score by comparing each of the text embeddings to the image embedding. The multi-modal model ranks each of the image-query pairs based on the semantic similarity score. In some cases, image-query pairs having a semantic similarity score higher than a threshold value are retained in synthetic dataset 905 for training an image generation model. In one embodiment, the multi-modal model is a Contrastive Language-Image Pre-Training (CLIP) model.

Second, the dataset is further ranked based on an aesthetic score by using an aesthetic evaluation model. For example, the aesthetic evaluating model is trained to rate the perceived aesthetics of an image. A high aesthetic score corresponds to an image having high perceived aesthetics. In one embodiment, images having an aesthetic score greater than 5 are retained in synthetic dataset 905 for training the image generation model. In some cases, the aesthetics of an image are evaluated based on detail, finesse, sharpness, composition, color balance, contrast, exposure, resolution, and tone. In some cases, an aesthetics score may be obtained based on user feedback. In some cases, images with vectors, logos, and templates may be discarded from the synthetic dataset 905. Synthetic dataset 905 includes the ranked dataset.

In one embodiment, synthetic dataset 905 is first ranked based on an aesthetic score and then based on a semantic similarity score. In one embodiment, synthetic dataset 905 is ranked based on a semantic similarity score or an aesthetic score. In some cases, ranking samples in synthetic dataset 905 is referred to as query sampling. Query sampling is an example of, or includes aspects of, the corresponding element described with reference to FIG. 10.

In an example training scheme, the image generation model is trained using synthetic dataset 905 to generate synthetic images based on a short text prompt. For example, given a short text prompt, the image generation system retrieves one hundred images corresponding to the short text prompt. In one aspect, synthetic dataset 905 includes the retrieved images. The one hundred images are ranked based on the semantic similarity score and the aesthetic score. In some cases, for example, the ranked images having a score less than a threshold value are removed from synthetic dataset 905.

In an evaluated experiment using the synthetic dataset 905, an image generation model is fine-tuned. For example, for each text query, the corresponding image is sampled based on the search ranking. For example, a sample weight (1/n) is assigned to each of the images, where n is the search rank. Accordingly, the image with the highest rank is selected more by the image generation model when a corresponding text query is provided.

In some embodiments, machine learning model 910 modifies synthetic dataset 905 to generate modified synthetic dataset 915. For example, machine learning model 910 generates modified synthetic dataset 915 by flipping the training samples in synthetic dataset 905. Accordingly, data preparation component 900 samples each unique image based on query rankings. For example, synthetic dataset 905 has a format of query→[($image_n$, $rank_n$), . . . ]:

Query1→[($Image_1$, 1), ($Image_2$, 3), ($Image_3$, 5), ($Image_4$, 6), ($Image_5$, 10)]

Query2→[($Image_2$, 2), ($Image_3$, 4), ($Image_1$, 5)]

Query3→[($Image_4$,1)]

After flipping training samples in synthetic dataset 905, modified synthetic dataset 915 is represented as image→[($query_n$, $rank_n$), . . . ]:

Image1→[($Query_1$, 1), ($Query_2$, 5)]

Image2→[($Query_2$, 2), ($Query_1$, 3)]

Image3→[($Query_2$, 4), ($Query_1$, 5)]

Image4→[($Query_3$,1), ($Query_1$, 6)]

Image5→[($Query_1$, 10)]

By flipping the training samples in synthetic dataset 905, image impressions are distributed evenly. In one aspect, the image generation system learns the relationship between the ranked images having high aesthetic and high semantic relevance and the closest synthetic queries (short text prompts). In one aspect, by using the modified synthetic dataset 915, the image generation model can generate diverse synthetic images. Moreover, performance and results in image generation are increased.

In some embodiments, modified synthetic dataset 915 is mixed with original dataset 920, and the mixed dataset is provided to data preparation component 900. For example, original dataset 920 may include training samples of image-caption pairs, where a length of the caption is longer than a threshold length. In some cases, original dataset 920 may include training samples from a different database or model. Accordingly, by mixing the modified synthetic dataset 915 with original dataset 920, data preparation component 900 can be used to augment existing image generation models.

Data preparation component 900 is an example of, or includes aspects of, the corresponding element described with reference to FIGS. 5, 6, and 10. Synthetic dataset 905 is an example of, or includes aspects of, the corresponding element described with reference to FIG. 6. Machine learning model 910 is an example of, or includes aspects of, the corresponding element described with reference to FIG. 5. Original dataset 920 is an example of, or includes aspects of, the corresponding element described with reference to FIG. 6.

Figure 10:
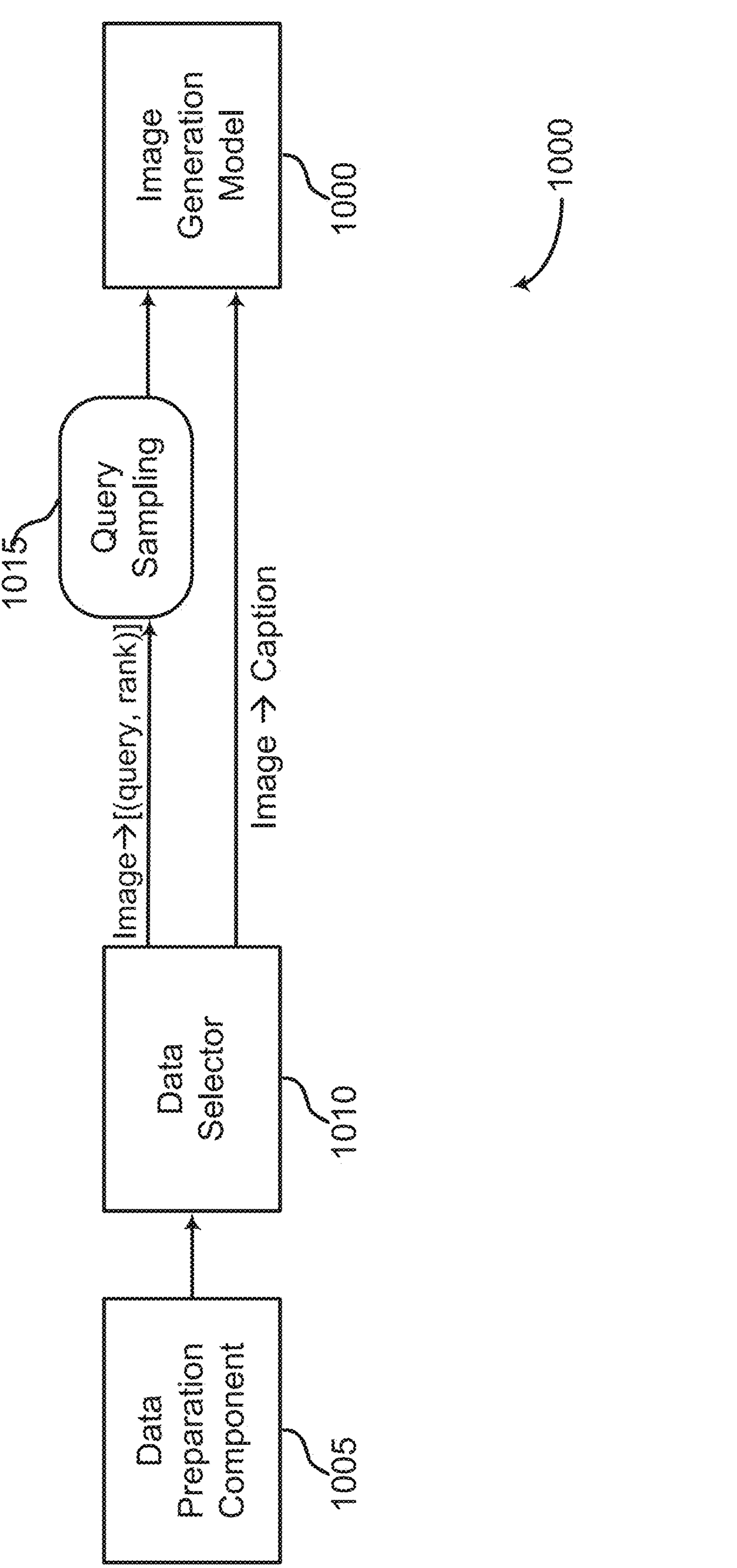
FIG. 10 shows an example of training an image generation model according to aspects of the present disclosure.

FIG. 10 shows an example of training an image generation model 1000 according to aspects of the present disclosure. The example shown includes image generation model 1000, data preparation component 1005, data selector 1010, and query sampling 1015.

Referring to FIG. 10, data preparation component 1005 is trained to provide a sample of an image with both caption and query set associated with the image. In some cases, the caption is referred to as a long text prompt. For example, the sample is represented as Image→Caption, [($query_1$,$rank_1$), . . . ($query_n$,$rank_n$)]. Data selector 1010 selects an image-caption pair or an image-query pair based on a probability value (or target ratio). The synthetic image generated by image generation model 1000 can be modified based on adjusting the target ratio. For example, by providing a ratio of 2 to the image-caption pair and 1 to the image-query pair, data selector 1010 is more likely to select and provide samples of image-caption pair to image generation model 1000 to generate synthetic images.

In one embodiment, the dataset (e.g., mixed modified synthetic dataset described with reference to FIG. 9) includes training samples with 75% image-caption pairs and 25% image-query pairs. For example, when data selector 1010 selects samples with image-query pairs, query sampling 1015 is performed based on ranks associated with each synthetic query. Further details on query sampling 1015 are described with reference to FIG. 9.

Image generation model 1000 is an example of, or includes aspects of, the corresponding element described with reference to FIGS. 3A, 3B, 5, and 6. Data preparation component 1005 is an example of, or includes aspects of, the corresponding element described with reference to FIGS. 5, 6, and 9.

Computing Device

Figure 11:
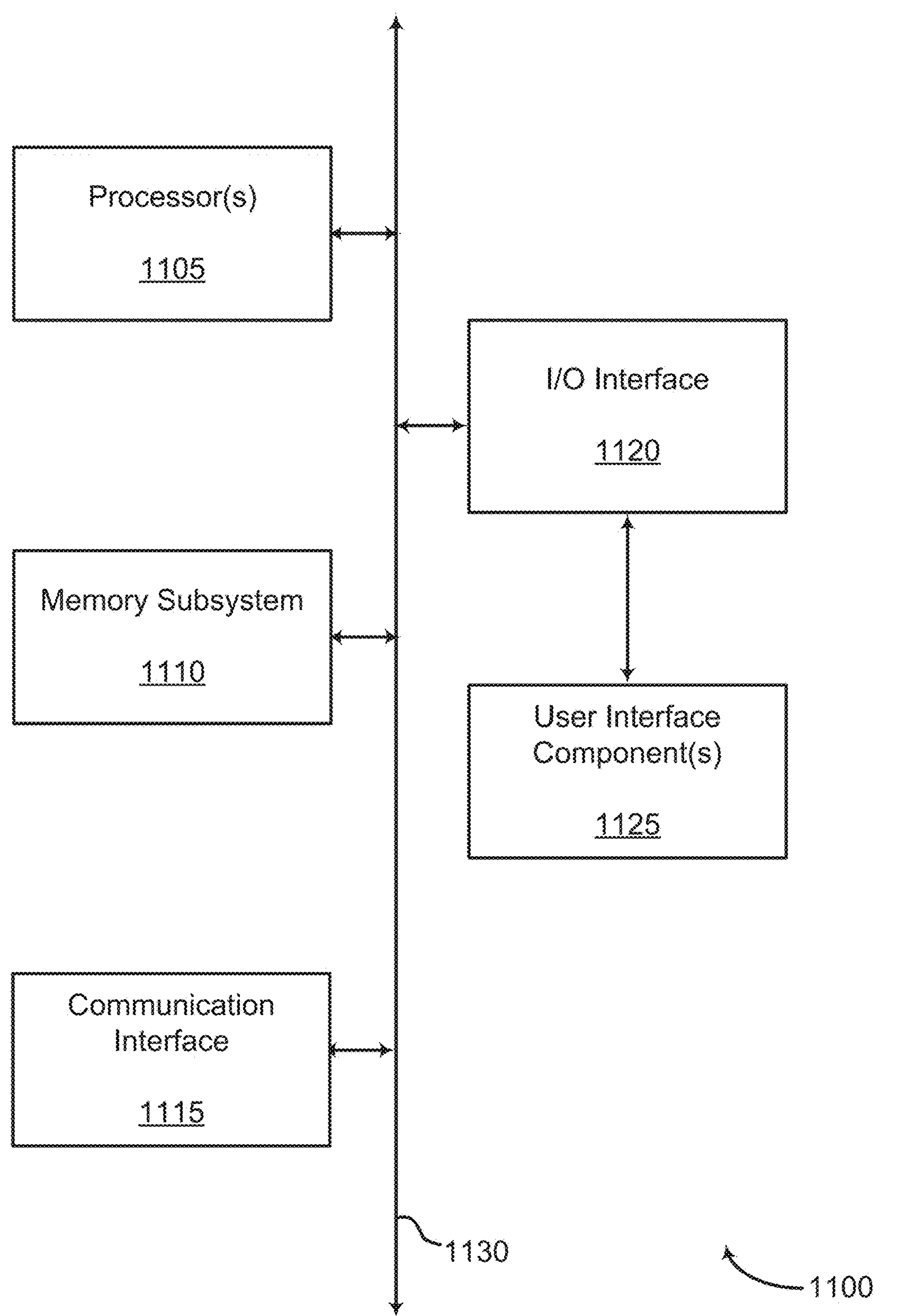
FIG. 11 shows an example of a computing device according to aspects of the present disclosure.

FIG. 11 shows an example of a computing device 1100 according to aspects of the present disclosure. The example shown includes computing device 1100, processor(s), memory subsystem 1110, communication interface 1115, I/O interface 1120, user interface component(s), and channel 1130.

In some embodiments, computing device 1100 is an example of, or includes aspects of, the image processing apparatus described with reference to FIGS. 1 and 5. In some embodiments, computing device 1100 includes one or more processors 1105 that can execute instructions stored in memory subsystem 1110 to obtain a short text prompt. The instructions further include to select an image generation model based on a length of the short text prompt. In some cases, the image generation model is trained to generate images based on short text prompts using training data including text prompts below a threshold length. The instructions further include to generate, using the image generation model, a synthetic image based on the short text prompt. In some cases, the synthetic image includes an element described by the short text prompt.

According to some embodiments, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1105 is an example of, or includes aspects of, the processor unit described with reference to FIG. 5.

According to some embodiments, memory subsystem 1110 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1110 is an example of, or includes aspects of, the memory unit described with reference to FIG. 5.

According to some embodiments, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1115.

According to some embodiments, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or hardware components controlled by the I/O controller.

According to some embodiments, user interface component(s) 1125 enables a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over existing technology (e.g., image generation models). Example experiments demonstrate that the image processing apparatus based on the present disclosure outperforms conventional image generation models. Details on the example use cases based on embodiments of the present disclosure are described with reference to FIGS. 3A and 3B.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a text prompt below a threshold length;

selecting an image generation model based on the text prompt being below the threshold length, wherein the image generation model is trained to generate images using training data including short text prompts below the threshold length and long text prompts, and wherein the training data is sampled based on a target ratio of the short text prompts and the long text prompts; and generating, using the selected image generation model, a synthetic image based on the text prompt, wherein the synthetic image includes an element described by the text prompt.

2. The method of claim 1, wherein:

the length of the text prompt is below the threshold length.

3. The method of claim 1, further comprising:

obtaining an additional text prompt, wherein a length of the additional text prompt is greater than the threshold length; and selecting an alternative image generation model based on the length of the additional text prompt.

4. The method of claim 1, wherein:

the synthetic image includes an additional element that is not described by the text prompt, and wherein the additional element is correlated with a semantic meaning of the text prompt in the training data.

5. The method of claim 1, further comprising:

encoding, using a text encoder, the text prompt to obtain a text embedding, wherein the image generation model receives the text embedding as an input.

6. The method of claim 1, wherein generating the synthetic image comprises:

performing a reverse diffusion process on a noisy input image based on the text prompt.

7. A method comprising:

obtaining training data including a text prompt describing an element and an image including the element described in the text prompt, wherein the text prompt is selected based on having a length less than a threshold length, and wherein the training data includes short text prompts below the threshold length and long text prompts above the threshold length;

generating a semantic similarity score for each of a plurality of candidate images; and training an image generation model to generate synthetic images including the element based on the training data and the semantic similarity score, wherein the training data is sampled based on a target ratio of the short text prompts and the long text prompts.

8. The method of claim 7, wherein:

the image includes an additional element that is not described by the text prompt, and wherein the image generation model is trained to generate the synthetic images to include the additional element based on text prompts describing the element.

9. The method of claim 7, wherein obtaining the training data comprises:

obtaining a caption for the image; and removing one or more words from the caption to obtain the text prompt.

10. The method of claim 9, further comprising:

dividing the caption into a plurality of noun chunks; and generating a plurality of text prompts based on the plurality of noun chunks.

11. The method of claim 7, wherein obtaining the training data comprises:

performing an image search based on the text prompt to obtain a plurality of candidate images, wherein the training data is based on the plurality of candidate images.

12. The method of claim 11, further comprising:

generating an aesthetic score for each of the plurality of candidate images, wherein the training data is based on the aesthetic score.

13. The method of claim 7, wherein:

the training data includes a long text prompt having a length greater than the threshold length and an additional image corresponding to the long text prompt.

14. The method of claim 13, wherein training the image generation model comprises:

identifying a target ratio of text prompts to additional text prompts; and sampling the training data based on the target ratio.

15. The method of claim 7, wherein training the image generation model comprises:

generating a predicted image using the image generation model; and computing a loss function based on the image and the predicted image.

16. An apparatus comprising:

a memory component; and a processing device coupled to the memory component, the processing device configured to perform operations comprising:

obtaining a text prompt below a threshold length;

selecting an image generation model based on the text prompt being below the threshold length, wherein the image generation model is trained to generate images using training data including short text prompts below the threshold length and long text prompts, and wherein the training data is sampled based on a target ratio of the short text prompts and the long text prompts; and generating, using the selected image generation model, a synthetic image based on the text prompt, wherein the synthetic image includes an element described by the text prompt.

17. The apparatus of claim 16, further comprising:

a text encoder comprising parameters stored in the at least one memory and trained to encode the text prompt to obtain a text embedding.

18. The apparatus of claim 16, wherein:

the image generation model is a diffusion model.

19. The apparatus of claim 16, further comprising:

a data preparation component comprising parameters stored in the at least one memory and trained to obtain training data including a plurality of text prompts and a plurality of images.

* * * * *